(12) United States Patent
Nakajima et al.

(10) Patent No.: US 6,429,160 B1
(45) Date of Patent: Aug. 6, 2002

(54) HIGH RIGIDITY GLASS-CERAMIC SUBSTRATE

(75) Inventors: Kousuke Nakajima, Samukawa-machi; Junko Ishioka; Katsuhiko Yamaguchi, both of Sagamihara; Naoyuki Goto, Machida; Takayuki Kishi, Sagamihara, all of (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

(21) Appl. No.: 09/577,720

(22) Filed: May 23, 2000

(30) Foreign Application Priority Data

Jun. 1, 1999 (JP) .......................................... 11-154052
May 2, 2000 (JP) ....................................... 2000-133213

(51) Int. Cl.$^7$ ........................... C03C 10/04; C03C 10/02
(52) U.S. Cl. ...................... 501/5; 501/10; 428/694 ST; 428/694 SG
(58) Field of Search ................. 501/5, 10; 428/694 ST, 428/694 SG

(56) References Cited

U.S. PATENT DOCUMENTS

| 4,687,749 A | * | 8/1987 | Beall | ............................ | 501/5 |
|---|---|---|---|---|---|
| 4,985,375 A | * | 1/1991 | Tanaka et al. | .................. | 501/5 |
| 5,491,116 A | | 2/1996 | Beall et al. | | |
| 5,535,194 A | | 7/1996 | Kawashima et al. | | |
| 6,245,411 B1 | * | 6/2001 | Goto et al. | .................. | 428/414 |

FOREIGN PATENT DOCUMENTS

| EP | 0939395 | | 12/1998 |
| EP | 0941973 | | 3/1999 |
| JP | 11278864 | * | 10/1999 |
| JP | 11278865 | * | 10/1999 |

* cited by examiner

*Primary Examiner*—Karl Group
(74) *Attorney, Agent, or Firm*—Hedman & Costigan, P.C.

(57) ABSTRACT

A high rigidity glass-ceramic substrate is provided which contains, as a predominant crystal phase or phases, at least one crystal phase selected from the group consisting of enstatite ($MgSiO_3$), enstatite solid solution ($MgSiO_3$ solid solution), magnesium titanate ($MgTi_2O$) and magnesium titanate solid solution ($MgTi_2O_5$ solid solution), has fine crystal grains (preferably globular crystal grains) of precipitated crystal phases, has excellent melting property of a base glass, high resistivity to devitrification, easiness in polishing, excellent smoothness in the surface after polishing and has high Young's modulus capable of coping with a high speed rotation.

11 Claims, No Drawings

HIGH RIGIDITY GLASS-CERAMIC SUBSTRATE

BACKGROUND OF THE INVENTION

This invention relates to a high rigidity glass-ceramic substrate and, more particularly, to a high rigidity glass-ceramic substrate for a magnetic information storage medium used, e.g., for a magnetic information storage device having a super flat substrate surface capable of coping with near contact recording or contact recording employed in the ramp loading system and capable also of coping with a high speed rotation of a magnetic information storage medium. The invention relates also to a magnetic information storage medium such as a magnetic disk which is provided by forming a film of an information storage medium on the glass-ceramic substrate.

In this specification, the term "magnetic information storage medium" means a magnetic information storage medium in the form of a disk and includes fixed type hard disks, removable type hard disks and card type hard disks used respectively for so-called "hard disks" for personal computers and also other disk type magnetic information storage media which can be used in HDTV, digital video cameras, digital cameras, mobile communication devices etc. In this specification, the term "spiner" means at least one of (Mg and/or Zn)$Al_2O_4$, (Mg and/or Zn)$_2TiO_4$ and a mixture in the form of a solid solution between these two crystals and the term "spinel solid solution" means a crystal in which other ingredient is mixed with spinel and/or a part of spinel is substituted by other ingredient.

Recent development of personal computers for multimedia purposes and digital video cameras and digital cameras requires handling of a large amount of data such as a moving picture and voice and, for this purpose, a magnetic information storage device of a large recording capacity is required. For increasing the recording density, there is a tendency in the art of a magnetic information storage medium toward reducing the size of a bit cell and thereby increasing the bit and track density. As a result, the magnetic head performs its operation in closer proximity to the disk surface. For coping with starting and stopping of a magnetic head which is operated in a near contact state or a contact state with respect to a magnetic information storage medium, a landing zone system has been developed according to which a specific part (an unrecorded part in a radially inside or outside portion of a disk) is processed for preventing stiction of the magnetic head to the disk.

In the current magnetic information storage device, the CSS (contact start stop) system is adopted according to which (1) the magnetic head is in contact with the magnetic information storage medium before starting its operation and, (2) when the magnetic head has started its operation, the magnetic head flies over the surface of the magnetic information storage medium. If the plane of contact between the magnetic head and the magnetic information storage medium is exceedingly in the state of a mirror surface, stiction of the magnetic head occurs resulting in unsmooth starting of rotation due to increased friction and damage to the surface of the magnetic information storage medium or the magnetic head. Thus, the magnetic information storage medium faces conflicting demands for lower flying height of the magnetic head accompanying increase in the storage capacity and prevention of stiction of the magnetic head to the surface of the magnetic information storage medium. As an answer to satisfy such conflicting demands, a ramp loading technique has been developed according to which the magnetic head in operation is completely in contact with the surface of the magnetic information storage medium but starting and stopping of the magnetic head are performed in an area outside of the surface of the magnetic information storage medium. Thus, there has been an increasing demand for a smoother surface of the magnetic information storage medium.

Developments are also in progress for transferring information at a higher speed by rotating a magnetic information storage medium at a higher speed. Since, however, a high speed rotation of a substrate for the magnetic information storage medium causes deflection and deformation in the substrate, the substrate is required to have a higher Young's modulus. Further, in addition to the currently used fixed type hard disks, magnetic information storage devices which use removable type hard disks and card type hard disks which require a high strength of the substrate are being considered and becoming feasible and application of the substrate to HDTV, digital video cameras, digital cameras and mobile communication devices is under way.

In the situation in which a high rigidity substrate material is required, an aluminum alloy substrate cannot provide a sufficient strength and, if thickness of the substrate is increased, it will make it difficult to realize a compact and light-weight design of the medium. For solving the problem inherent in the aluminum alloy substrate, known in the art are chemically tempered glasses such as alumino-silicate ($SiO_2$—$Al_2O_3$—$Na_2O$) glass proposed by Japanese Patent Application Laid-open Publication Nos. Hei 8-48537 and Hei 5-32431 etc.). These chemically tempered glasses, however, have the following disadvantages: (1) Since polishing is made after the chemical tempering process, the chemically tempered layer is seriously instable in making the disk thinner. (2) Since the chemically tempered phase causes aging when used for a long time, magnetic properties of the magnetic information storage medium are deteriorated. (3) Since the glass contains $Na_2O$ or $K_2O$ ingredient as an essential ingredient, these alkali ingredients diffuse in the film formed during the film forming process and thereby deteriorate magnetic properties of the magnetic information storage medium. For preventing this, a barrier coating over the entire surface for preventing diffusion of $Na_2O$ or $K_2O$ becomes necessary and this makes it difficult to produce the product in a stable manner at a low cost. (4) Chemical tempering is made for improving mechanical strength of the glass but this is based on utilization of tempering stress between the surface phase and the inside phase. Young's modulus of the chemically tempered glass is 830 GPa or below which is equivalent to ordinary amorphous glass and this poses limitation to application of the chemically tempered glass to a high speed rotation drive. Thus, the chemically tempered glasses are not sufficient as a substrate for a high recording density magnetic information storage medium.

Aside from the aluminum alloy substrates and chemically tempered substrates, known in the art are some glass-ceramic substrates. For example, glass-ceramic substrates disclosed in Japanese Patent Application Laid-open Publication No. Hei 9-35234 and EP0781731A1 have a $Li_2O$—$SiO_2$ composition and contain lithium disilicate and β-spodumene crystal phases or lithium disilicate and β-cristobalite crystal phases. In the glass-ceramic substrates, however, no consideration or suggestion is made about relation between Young's modulus and specific gravity al all. Young's modulus of these glass-ceramics is 100 GPa at the maximum.

For improving such low Young's modulus, Japanese Patent Application Laid-open Publication No. Hei 9-77531 discloses a glass-ceramic of a $SiO_2$—$Al_2O_3$–Mgo—ZnO—$TiO_2$ system and a rigid disk substrate for a magnetic information storage medium. This glass-ceramic contains a large quantity of spinel as a predominant crystal phase and also contains $MgTi_2O_5$ and other crystal phases as sub-crystal phases and has Young's modulus of 96.5–165.5 GPa. In this material, the predominant crystal phase is only spinel represented by $(Mg/Zn)Al_2O_4$ and/or $(Mg/Zn)_2TiO_4$ and the sub-crystal phases are not limited to specific crystals but crystals of a broad range are mentioned. Further, this glass-ceramic contains a large amount of $Al_2O_3$ and is different from the glass-ceramics of the present invention which contain a relatively small amount of $Al_2O_3$ and have a high Young's modulus and resistivity to devitrification. Such large amount of $Al_2O_3$ deteriorates melting property of a base glass and resistivity to devitrification and thereby adversely affects productivity. The proposed glass-ceramic, therefore, is a merely rigid material. Furthermore, the glass-ceramic of this system has an exceedingly high surface hardness (Vickers hardness) and this adversely affects processability and large scale production. Accordingly, the improvement achieved by this substrate material is still insufficient for a substrate of a high recording density magnetic information storage medium.

WO 98/22405 publication discloses a glass-ceramic of a $SiO_2$—$Al_2O_3$—MgO—$ZrO_2$—$TiO_2$—$Li_2O$ system. This glass-ceramic contains β-quarts solid solution as a predominant crystal phase and enstatite, spinel and other crystals as sub-crystal phases and has a crystal grain diameter of 1000 Å or below. This glass-ceramic, however, requires $Li_2O$ as an essential ingredient in its composition and, besides, requires β-quarts solid solution as its predominant crystal phase and, therefore, is entirely different from the glass-ceramics of the present invention.

It is, therefore, an object of the present invention to overcome the problems of the prior art substrates and provide a high rigidity glass-ceramic substrate which is suitable for a substrate of a magnetic information storage medium having excellent surface characteristics capable of coping with the ramp loading system (i.e., contact recording of the magnetic head) for high density recording and having a high Young's modulus characteristics capable of coping with a high speed rotation and surface hardness characteristics suitable for processing.

It is another object of the invention to provide a magnetic information storage disk provided by forming a magnetic information storage film on such glass-ceramic substrate.

SUMMARY OF THE INVENTION

Accumulated studies and experiments made by the inventors of the present invention for achieving the above described objects of the invention have resulted in the finding, which has led to the present invention, that a high rigidity glass-ceramic substrate can be provided which contains, as a predominant crystal phase or phases, at least one crystal phase selected from the group consisting of enstatite ($MgSiO_3$), enstatite solid solution ($MgSiO_3$ solid solution), magnesium titanate ($MgTi_2O_5$) and magnesium titanate solid solution ($MgTi_2O_5$ solid solution), has fine crystal grains (preferably globular crystal grains) of precipitated crystal phases, has excellent melting property of a base glass, high resistivity to devitrification, easiness in polishing, excellent smoothness in the surface after polishing and has high Young's modulus capable of coping with a high speed rotation.

For achieving the objects of the invention, there is provided a high rigidity glass-ceramic substrate having a pre-dominant crystal phase or phases, said predominant crystal phase being at least one selected from the group consisting of enstatite ($MgSiO_3$), enstatite solid solution ($MgSiO_3$ solid solution), magnesium titanate ($MgTi_2O_5$) and magnesium titanate solid solution ($MgTi_2O_5$ solid solution), and glass-ceramic constituting the glass-ceramic substrate having Young's modulus within a range from 115 GPa to 160 GPa and containing less than 20 weight percent of $Al_2O_3$ ingredient.

In one aspect of the invention, there is provided a high rigidity glass-ceramic substrate having a predominant crystal phase or phases, said predominant crystal phase comprising enstatite ($MgSiO_3$) or enstatite solid solution ($MgSiO_3$ solid solution) as a first crystal phase having the largest ratio of precipitation, and glass-ceramic constituting the glass-ceramic substrate having Young's modulus within a range from 115 GPa to 160 GPa and containing less than 20 weight percent of $Al_2O_3$ ingredient.

In another aspect of the invention, there is provided a high rigidity glass-ceramic substrate having a predominant crystal phase or phases, said predominant crystal phase comprising magnesium titanate ($MgTi_2O_5$) or magnesium titanate solid solution ($MgTi_2O_5$ solid solution) as a first crystal phase having the largest ratio of precipitation, and glass-ceramic constituting the glass-ceramic substrate having Young's modulus within a range from 115 GPa to 160 GPa and containing less than 20 weight percent of $Al_2O_3$ ingredient.

In another aspect of the invention, there is provided a high rigidity glass-ceramic substrate having a predominant crystal phase or phases, said predominant crystal phase comprising enstatite ($MgSiO_3$) or enstatite solid solution ($MgSiO_3$ solid solution) as a first crystal phase having the largest ratio of precipitation and at least one selected from the group consisting of magnesium titanate ($MgTi_2O_5$), magnesium titanate solid solution ($MgTi_2O_5$ solid solution), spinel and spinel solid solution as a second crystal phase having a smaller ratio of precipitation than the first crystal phase, and glass-ceramic constituting the glass-ceramic substrate having Young's modulus within a range from 115 GPa to 160 GPa and containing less than 20 weight percent of $Al_2O_3$ ingredient.

In another aspect of the invention, there is provided a high rigidity glass-ceramic substrate having a predominant crystal phase or phases, said predominant crystal phase comprising magnesium titanate ($MgTi_2O_5$) or magnesium titanate solid solution ($MgTi_2O_5$) as a first crystal phase having the largest ratio of precipitation and at least one selected from the group consisting of enstatite ($MgSiO_3$) or enstatite solid solution ($MgSiO_3$ solid solution), spinel and spinel solid solution as a second crystal phase having a smaller ratio of precipitation than the first crystal phase, and glass-ceramic constituting the glass-ceramic substrate having Young's modulus within a range from 115 GPa to 160 GPa and containing less than 20 weight percent of $Al_2O_3$ ingredient.

In another aspect of the invention, said glass-ceramic is substantially free from $Li_2O$, $Na_2O$ and $K_2O$.

In another aspect of the invention, the high rigidity glass-ceramic substrate has a surface roughness Ra (arithmetic mean roughness) after polishing of 8 Å or below and a maximum surface roughness Rmax after polishing of 100 Å or below.

In another aspect of the invention, the high rigidity glass-ceramic substrate has a coefficient of thermal expansion within a range from $40 \times 10^{-7}/°$ C. to $60 \times 10^{-7}/°$ C. within a temperature range from $-50°$ C. to $+70°$ C.

In another aspect of the invention, said predominant crystal phase has a crystal grain diameter within a range from 0.05 μm to 0.30 μm.

In another aspect of the invention, the high rigidity glass-ceramic substrate has Vickers hardness within a range from 6860 N/mm² to 8330 N/mm².

In another aspect of the invention, the glass-ceramic comprises in weight percent on the oxide basis:

| | |
|---|---|
| $SiO_2$ | 40–60% |
| MgO | 10–20% |
| $Al_2O_3$ | 10% to less than 20% |
| CaO | 0.5–4% |
| SrO | 0.5–4% |
| BaO | 0.5–5% |
| $ZrO_2$ | 0–5% |
| $TiO_2$ | more than 8% to 12% |
| $Bi_2O_3$ | 0–6% |
| $Sb_2O_3$ | 0–1% |
| $As_2O_3$ | 0–1%. |

In another aspect of the invention, the high rigidity glass-ceramic substrate further comprises an element selected from the group consisting of P, W, Nb, La, Y and Pb in an amount up to 3 weight percent on the oxide basis and/or an element selected from the group consisting of Cu, Co, Fe, Mn, Cr, Sn and V in an amount up to 2 weight percent on the oxide basis.

In another aspect of the invention, the high rigidity glass-ceramic substrate is provided by melting glass materials, forming and annealing a base glass and subjecting the base glass to heat treatment for crystallization under a nucleation temperature within a range from 650° C. to 750° C., a nucleation time within a range from one hour to twelve hours, a crystallization temperature within a range from 850° C. to 1000° C. and a crystallization time within a range from one hour to twelve hours.

In still another aspect of the invention, there is provided a magnetic information storage disk provided by forming a film of a magnetic information storage medium on the above described high rigidity glass-ceramic substrate.

DETAILED DESCRIPTION OF THE INVENTION

Reasons for limiting physical properties, predominant crystal phases, crystal grain diameter, surface characteristics and composition of the glass-ceramics of the present invention will now be described. The composition of the glass-ceramic is expressed on the basis of composition of oxides.

Description will be made first about Young's modulus. As described previously, for improving recording density and data transfer speed, there is tendency toward a higher speed rotation of a magnetic information storage medium. For coping with such tendency, the substrate must have high rigidity and low specific gravity for preventing vibration of a disk caused by deflection of the disk during a high speed rotation. If the substrate has high rigidity but large specific gravity, deflection of the disk occurs during a high speed rotation due to its large weight which will result in vibration. Conversely, if the disk has small specific gravity but low rigidity, vibration will similarly take place.

In the glass-ceramic substrate of the present invention having the above described predominant crystal phase or phases, there is the tendency that, if ingredients are adjusted to increase rigidity highly, specific gravity will increase to an excessive degree whereas if ingredients are adjusted to decrease specific gravity largely, rigidity will decrease to an undesirable degree. Accordingly, a balance must be found between rigidity and specific gravity so that apparently conflicting requirements for high rigidity and low specific gravity will both be satisfied. As a result of studies and experiments, it has been found that Young's modulus should be 115 GPa or over while low specific gravity is maintained and Young's modulus should not exceed 160 GPa having regard to the balance with specific gravity. More preferably, Young's modulus should be 120 GPa or over and 150 GPa or below. A preferable value of Young's modulus/specific gravity is 37 GPa or over and a more preferable value thereof is 39 GPa or over. The substrate should preferably have specific gravity of 3.3 or below and, more preferably, 3.1 or below.

A higher Young's modulus generally causes an increased surface hardness of the material. An excessive surface hardness results in prolonged processing time in polishing the material and this will adversely affect productivity and prevent a low cost production. Having regard to the influence of processability on productivity, the surface hardness (Vickers hardness) of the substrate should preferably be within a range from 6860 N/mm² to 8330 N/mm².

As to $Li_2O$, $Na_2O$ and $K_2O$, if these ingredients are included in a magnetized film (particularly perpendicular magnetized film) which is required to have higher precision and finer quality, ions of these ingredients will diffuse in the film during the film forming process which will cause abnormal growth of magnetized film grains or deterioration in the orientation. It is therefore important in the substrate of the present invention to be substantially free from these ingredients.

Description will now be made about predominant crystal phases. It is a feature of the invention that the substrate contains, as its predominant crystal phase or phases, at least one crystal phase selected from the group consisting of enstatite ($MgSiO_3$), enstatite solid solution ($MgSiO_3$ solid solution), magnesium titanate ($MgTi_2O$) and magnesium titanate solid solution ($MgTi_2O_5$ solid solution). This is because these crystal phases have the advantages that they contribute to increasing rigidity of the material and precipitating crystal grains of a small grain diameter and also have sufficient processability in the polishing process.

For achieving the above described physical properties, it is preferable for the substrate to contain enstatite ($MgSiO_3$) or enstatite solid solution ($MgSiO_3$ solid solution), magnesium titanate ($MgTi_2O_5$) or magnesium titanate solid solution ($MgTi_2O_5$ solid solution) as the first crystal phase having the largest ratio of precipitation.

In a case where the first crystal phase is enstatite or enstatite solid solution, the second crystal phase having a smaller ratio of precipitation than the first crystal phase should preferably be at least one selected from the group consisting of magnesium titanate, magnesium titanate solid solution, spinel and spinel solid solution. In a case where the first crystal phase is magnesium titanate or magnesium titanate solid solution, the second crystal phase should preferably be at least one selected from the group consisting of enstatite, enstatite solid solution, spinel and spinel solid solution.

Spinel includes $MgAl_2O_4$, $Mg_2TiO_4$ or a mixture in the form of a solid solution of these materials and spinel solid solution includes a crystal in which other ingredient is mixed with spinel or a crystal in which a part of spinel is substituted by other ingredient.

For achieving desirable physical properties and processability, a particularly preferably form of the substrate in terms of the predominant crystal phase is one containing magnesium titanate or magnesium titanate solid solution as the first crystal phase having the largest ratio of precipitation and enstatite or enstatite solid solution as the second crystal phase having a smaller ratio of precipitation and containing no spinel or spinel solid solution. The glass-ceramic having this form of crystal phases can be obtained by adopting a composition containing 2–5% BaO and 0.5–5% $ZrO_2$.

Description will now be made about the crystal grain diameter of the precipitated crystal phases and the surface roughness. As described previously, for coping with the near contact recording system or the contact recording system for improving recording density, the magnetic information storage medium must have a more flat surface than the prior art medium. If one attempts to perform high recording density inputting and outputting of information on a magnetic information storage medium having a surface of the prior art flatness, a high recording density magnetic recording cannot be achieved because distance between the magnetic head and the medium is too large. If this distance is reduced, collision of the magnetic head against the surface of the medium occurs with resulting damage to the head and medium. For this reason, for achieving the flatness of the substrate surface capable of coping with the near contact recording system or the contact recording system, it has been found that the surface roughness Ra should be 8 Å or below and the maximum surface roughness Rmax should be 100 Å or below. More preferably, the surface roughness Ra should be 4 Å or below and the maximum surface roughness Rmax should be 50 Å or below and most preferably, the surface roughness Ra should be 2.5 Å or below and the maximum surface roughness Rmax should be 35 Å or below.

Description will now be made about the coefficient of thermal expansion. In increasing the bit and track densities and thereby reducing the size of the bit cell, difference in the coefficient of thermal expansion between the medium and the substrate has a great influence. This physical property is greatly influenced by the type of crystal phases grown and the ratio and amount of precipitation of the crystal phases. Having regard to the coefficient of thermal expansion of the medium and the crystal phases of the glass-ceramic substrate of the present invention, a proper coefficient of thermal expansion in the temperature range from −50° C. to +70° C. is within a range from $40 \times 10^{-7}/°C$ to $60 \times 10^{-7}/°C$.

Reasons for limiting the composition range will now be described.

The $SiO_2$ ingredient is a very important ingredient for growing enstatite or enstatite solid solution as a predominant crystal phase by heat treating the base glass. If the amount of this ingredient is below 40%, the grown crystal phase of the glass-ceramic obtained is instable and its texture tends to become coarse and, further, resistivity to devitrification of the base glass is deteriorated. If the amount of this ingredient exceeds 60%, difficulty arises in melting and forming of the base glass.

The MgO ingredient is a very important ingredient for growing enstatite, enstatite solid solution, magnesium titanate or magnesium titanate solid solution as a predominant crystal phase and also growing spinel or spinel solid solution by heat treating the base glass. If the amount of this ingredient is below 10%, a desired crystal cannot be obtained and, if obtained, the grown crystal of the glass-ceramic is instable and its texture tends to become coarse and, further, its melting property is deteriorated. If the amount of this ingredient exceeds 20%, resistivity to devitrification is deteriorated.

The $Al_2O_3$ ingredient is a very important ingredient for growing enstatite solid solution or magnesium titanate solid solution as a predominant crystal phase and also growing spinel or spinel solid solution by heat treating the base glass. If the amount of this ingredient is below 10%, a desired crystal cannot be obtained and, if obtained, the grown crystal of the glass-ceramic is instable and its texture tends to become coarse and, further, its melting property is deteriorated. If the amount of this ingredient is 20% or over, melting property and resistivity to devitrification of the base glass are deteriorated and, moreover, spinel becomes predominant as the first crystal phase resulting in significant increase in the hardness of the substrate which is undesirable for processability. A preferable range of this ingredient is 10% to less than 18% and a more preferable range thereof is 10% to 17%.

The CaO ingredient is an ingredient which improves the melting property of the glass and prevents the grown crystal from becoming coarse. If the amount of this ingredient is below 0.5%, such effects cannot be obtained whereas if the amount of this ingredient exceeds 4%, the grown crystal tends to become coarse, the crystal phase tends to change and chemical durability is deteriorated.

The SrO ingredient is added for improving the melting property of the glass. If the amount of this ingredient is below 0.5%, this effect cannot be obtained. Addition of this ingredient up to 4% will suffice. The BaO ingredient is preferably added for improving the melting property of the glass. The amount of this ingredient is preferably 0.5% or over and more preferably 2% or over. Addition of this ingredient up to 5% will suffice.

The $ZrO_2$ and $TiO_2$ ingredients are important ingredients which, in addition to a function as a nucleating agent, are effective for making the grown crystals fine, improving the mechanical strength and improving chemical durability. The $ZrO_2$ ingredient should preferably be added in the amount of 0.5% or over and addition of up to 5% will suffice. As to the $TiO_2$ ingredient, if the amount of this ingredient is 8% or below, softening tends to occur during the crystallization process and, if the amount of this ingredient exceeds 12%, melting of the base glass becomes difficult and resistivity to devitrification is deteriorated.

The $Bi_2O_3$ ingredient is effective for preventing devitrification of the base glass without impairing the melting property and formability of the base glass. If the amount of this ingredient exceeds 6%, erosion of Pt or $SiO_2$ of the melting pot becomes significant.

The $Sb_2O_3$ and $As_2O_3$ ingredients may be used as refining agents in melting of the glass. Addition of each of these ingredients up to 1% will suffice.

For adjusting properties of the glass-ceramics and for other purposes, an element selected from the group consisting of P, W, Nb, La, Y and Pb may be added up to 3% on the oxide basis and an element selected from the group consisting of Cu, Co, Fe, Mn, Cr, Sn and V may be added up to 2% on the oxide basis respectively within a range in which the properties of the glass-ceramics will not be impaired.

EXAMPLES

Examples of the present invention will be described below.

Tables 1 to 4 show examples (No. 1 to No. 9) of compositions of the high rigidity glass-ceramic substrate made according to the invention and also comparative examples of the prior art compositions (Comparative Example No. 1 for the alumino-silicate glass (chemically tempered glass) disclosed by Japanese Patent Application Laid-open Publication No. Hei 8-48537, Comparative Example No. 2 for the $Li_2O$—$SiO_2$ glass-ceramics disclosed by Japanese Patent Application Laid-open No. Hei 9-35234 and Comparative Example No. 3 for the $SiO_2$—$Al_2O_3$—$MgO$—$ZnO$—$TiO_2$ glass-ceramics disclosed by Japanese Patent Application Laid-open Publication No. Hei 9-77531 together with nucleation temperature, crystallization temperature, crystal phases, crystal grain diameter, Young's modulus, Vickers hardness, specific gravity, surface roughness Ra after polishing, maximum surface roughness Rmax after polishing and coefficient of thermal expansion within the temperature range from −50° C. to +70° C. The ratio of precipitation of the respective crystal phases were obtained by preparing 100% crystal reference specimens of each crystal phase and measuring diffraction peak areas by an X-ray diffractometer (XRD) using the internal reference method. The crystal grain diameter was obtained by a transmission electron microscope (TEM). The crystal type of crystal grains was determined by the TEM structure analysis. The surface roughness Ra was determined by an atomic force microscope (AFM). In the tables, the crystal phases were described in the order of magnitude of the ratio of precipitation. The order of the ratio of precipitation was determined by the height of main peak of the respective crystal phases obtained by X-ray diffraction. In Example Nos. 1 to 4, magnesium titanate solid solution is abbreviated as "magnesium titanate SS", spinel solid solution as "spinel SS" and, as to solid solutions of other crystals, solid solution portions after the names of crystals are abbreviated as "SS" (e.g., β-quartz solid solution is abbreviated as "β-quartz SS").

TABLE 1

| | Examples | | |
|---|---|---|---|
| Ingredients (weight %) | 1 | 2 | 3 |
| $SiO_2$ | 49.0 | 49.0 | 51.0 |
| MgO | 14.0 | 15.0 | 14.0 |
| $Al_2O_3$ | 17.0 | 16.0 | 17.0 |
| CaO | 1.7 | 1.7 | 1.4 |
| SrO | 1.7 | 1.7 | 1.4 |
| BaO | 4.2 | 4.2 | 3.5 |
| $ZrO_2$ | 1.4 | 1.4 | 0.8 |
| $TiO_2$ | 9.0 | 9.0 | 9.0 |
| $Bi_2O_3$ | 1.8 | 1.8 | 1.7 |
| $Sb_2O_3$ | 0.2 | 0.2 | 0.2 |
| Nucleation temperature (° C.) | 700 | 700 | 700 |
| Nucleation time (hour) | 5 | 3 | 8 |
| Crystallization temperature (° C.) | 900 | 950 | 950 |
| Crystallization time (hour) | 3 | 7 | 5 |
| Crystal phase | enstatite ($MgSiO_3$) magnesium titanate SS ($MgTi_2O_5SS$) | magnesium titanate SS ($MgTi_2O_5SS$) enstatite ($MgSiO_3$) | magnesium titanate SS ($MgTi_2O_5SS$) enstatite ($MgSiO_3$) |
| Grain diameter | 0.1 μm | 0.1 μm | 0.1 μm |
| Young's modulus (GPa) | 116 | 125 | 120 |
| Vickers hardness (N/mm²) | 7056 | 7640 | 7840 |
| Specific gravity | 2.97 | 3.03 | 2.95 |
| Young's modulus/specific gravity(GPa) | 39.1 | 41.3 | 40.7 |
| Surface roughness Ra (Å) | 3 | 4 | 2.5 |
| Maximum surface roughness Rmax (Å) | 50 | 62 | 49 |
| Coefficient of thermal | 51 | 49 | 50 |

TABLE 1-continued

| | Examples | | |
|---|---|---|---|
| Ingredients (weight %) | 1 | 2 | 3 |
| expansion (×10⁻⁷/° C.) (−50° C.→+70° C.) | | | |

TABLE 2

| | Examples | | |
|---|---|---|---|
| Ingredients (weight %) | 4 | 5 | 6 |
| $SiO_2$ | 45.5 | 45.5 | 52.7 |
| MgO | 17.0 | 17.0 | 15.0 |
| $Al_2O_3$ | 19.0 | 19.0 | 16.0 |
| CaO | 1.2 | 1.2 | 1.4 |
| SrO | 1.2 | 1.2 | 1.4 |
| BaO | 1.4 | 1.4 | 3.5 |
| $ZrO_2$ | — | — | 0.8 |
| $TiO_2$ | 9.5 | 9.5 | 9.0 |
| $Bi_2O_3$ | 5.0 | 2.5 | — |
| $Sb_2O_3$ | 0.2 | 0.2 | 0.2 |
| Other ingredient | — | 2.5($WO_3$) | — |
| Nucleation temperature (° C.) | 700 | 700 | 700 |
| Nucleation time (hour) | 9 | 3 | 5 |
| Crystallization temperature (° C.) | 900 | 950 | 950 |
| Crystallization time (hour) | 5 | 5 | 2 |
| Crystal phase | enstatite ($MgSiO_3$) spinel SS ($MgAl_2O_4SS$) | enstatite ($MgSiO_3$) spinel SS ($MgAl_2O_4SS$) | enstatite ($MgSiO_3$) magnesium titanate SS ($MgTi_2O_5SS$) |
| Grain diameter | 0.1 μm | 0.1 μm | 0.1 μm |
| Young's modulus (GPa) | 135 | 123 | 120 |
| Vickers hardness (N/mm²) | 7840 | 7930 | 8036 |
| Specific gravity | 2.97 | 3.10 | 2.91 |
| Young's modulus/specific gravity(GPa) | 45.5 | 39.7 | 41.2 |
| Surface roughness Ra (Å) | 3 | 6 | 4 |
| Maximum surface roughness Rmax (Å) | 50 | 70 | 62 |
| Coefficient of thermal expansion (×10⁻⁷/° C.) (−50° C.→+70° C.) | 51 | 48 | 51 |

TABLE 3

| | Examples | | |
|---|---|---|---|
| Ingredients (weight %) | 7 | 8 | 9 |
| $SiO_2$ | 55.0 | 51.0 | 44.0 |
| MgO | 10.0 | 15.0 | 18.0 |
| $Al_2O_3$ | 17.5 | 16.0 | 19.0 |
| CaO | 1.2 | 1.4 | 1.0 |
| SrO | 1.2 | 1.4 | 1.0 |
| BaO | 1.9 | 3.5 | 2.5 |
| $ZrO_2$ | — | 0.8 | — |
| $TiO_2$ | 9.5 | 9.0 | 10.0 |
| $Bi_2O_3$ | 3.0 | 1.7 | 4.0 |
| $Sb_2O_3$ | 0.2 | 0.2 | 0.5 |
| Other ingredient | — | — | — |
| Nucleation temperature (° C.) | 700 | 700 | 700 |
| Nucleation time (hour) | 3 | 5 | 5 |
| Crystallization | 950 | 1000 | 900 |

TABLE 3-continued

| | Examples | | |
|---|---|---|---|
| Ingredients (weight %) | 7 | 8 | 9 |
| temperature (° C.) | | | |
| Crystallization time (hour) | 5 | 1 | 5 |
| Crystal phase | magnesium titanate SS (MgTi$_2$O$_5$SS) enstatite (MgSiO$_3$) β-quarts SS (β-SiO$_2$SS) | enstatite (MgSiO$_3$) magnesium titanate SS (MgTi$_2$O$_5$SS) rutile (TiO$_2$) | enstatite (MgSiO$_3$) spinel SS (MgAl$_2$O$_4$SS) |
| Grain diameter | 0.1–0.2 μm | 0.1–0.3 μm | 0.1 μm |
| Young's modulus (GPa) | 130 | 123 | 148 |
| Vickers hardness (N/mm$^2$) | 7930 | 8232 | 7742 |
| Specific gravity | 2.88 | 2.97 | 3.15 |
| Young's modulus/ specific gravity(GPa) | 45.1 | 41.4 | 47.0 |
| Surface roughness Ra (Å) | 7 | 8 | 6 |
| Maximum surface roughness Rmax (Å) | 80 | 92 | 75 |
| Coefficient of thermal expansion (×10$^{-7}$/° C.) (−50° C.–+70° C.) | 53 | 50 | 50 |

TABLE 4

| | Comparative Examples | | |
|---|---|---|---|
| Ingredients (weight %) | 1 | 2 | 3 |
| SiO$_2$ | 62.0 | 78.5 | 49.0 |
| MgO | — | — | 12.0 |
| Al$_2$O$_3$ | 16.0 | 4.4 | 24.8 |
| P$_2$O$_5$ | — | 2.0 | — |
| ZnO | — | — | 5.0 |
| TiO$_2$ | — | — | 10.0 |
| Li$_2$O | 7.0 | 12.5 | — |
| Other alkali ingredient | 9.0(Na$_2$O) | 2.8(K$_2$O) | — |
| ZrO$_2$ | 4.0 | — | — |
| Sb$_2$O$_3$ | 0.5 | 0.2 | — |
| Other ingredient | — | — | As$_2$O$_3$ – 0.5 |
| Nucleation temperature (° C.) | — | 450 | 700 |
| Nucleation time (hour) | — | 5 | 5 |
| Crystallization temperature (° C.) | — | 850 | 965 |
| Crystallization time (hour) | — | 5 | 5 |
| Crystal phase and grain diameter | — | lithium disilicate (Li$_2$Si$_2$O$_5$) 0.10 μm α-cristobalite (α-SiO$_2$) 0.30 μm | spinel (MgAl$_2$O$_4$) 0.10 μm enstatite (MgSiO$_3$) 0.10 μm |
| Young's modulus (GPa) | 82 | 92 | 119 |
| Specific gravity | 2.54 | 2.51 | 2.87 |
| Young's modulus/specific gravity(GPa) | 32.2 | 36.7 | 41.5 |
| Vickers hardness (N/mm$^2$) | 6272 | 7448 | 9800 |
| Surface roughness Ra (Å) | 8 | 11 | 65 |
| Maximum surface roughness Rmax (Å) | 86 | 140 | 679 |
| Coefficient of thermal expansion (×10$^{-7}$/° C.) (−50° C.–+70° C.) | 70 | 61 | 53 |

For manufacturing the glass-ceramic substrate of the above described examples, materials including oxides, carbonates and nitrates are mixed and melted in conventional melting apparatus at a temperature within a range from about 1350° C. to about 1490° C. The molten glass is stirred to homogenize it and thereafter formed into a disk shape and annelaed to provide a formed glass. Then, the formed glass is subjected to heat treatment to produce the crystal nucleus under a temperature within the range from 650° C. to 750° C. for about one to twelve hours and then is further subjected to heat treatment for crystallization under a temperature within the range from 850° C. to 1000° C. for about one to twelve hours to obtain a desired glass-ceramic. Then, the glass-ceramic is lapped with lapping grains having an average grain diameter of 5–30 μm for about 10 minutes to 60 minutes and then is finally polished with a cerium oxide grains or zirconia grains having an average grain diameter of 0.5–2 μm for about 30 minutes to 60 minutes.

As shown in Tables 1 to 4, the glass-ceramics of the present invention are different from the prior art comparative examples of alumino-silicate chemically tempered glass, Li$_2$O—SiO$_2$ glass-ceramics and SiO$_2$—Al$_2$O$_3$—MgO—ZnO—TiO$_2$ glass-ceramics in the crystal phase of the glass-ceramics. In comparison of Young's modulus, the glass-ceramics of the present invention have higher rigidity than the alumino-silicate chemically tempered glass and the Li$_2$O—SiO$_2$ glass-ceramics. The SiO$_2$—Al$_2$O$_3$—MgO—ZnO—TiO$_2$ glass-ceramics of the Comparative Example No. 3 has such a high surface hardness (Vickers hardness of 9800 N/mm$^2$) that a desired surface roughness cannot be obtained by the normal polishing method. In contrast, the glass-ceramics of the present invention have Vickers hardness of 8330 N/mm$^2$ or below and can be polished to a sufficiently smooth surface by the normal polishing method and, moreover, have no defects such as anisotropy, foreign matters and impurities and have a dense, uniform and fine texture (having a crystal grain diameter of 0.3 μm or below) and sufficient chemical durability to rinsing by various chemicals and water or etching.

What is claimed is:

1. A high rigidity glass-ceramic substrate having a predominant crystal phase or phases, said predominant crystal phase comprising enstatite (MgSiO$_3$) or enstatite solid solution (MgSiO$_3$ solid solution) as a first crystal phase having the largest ratio of precipitation, and glass-ceramic constituting the glass-ceramic substrate having Young's modulus within a range from 115 GPa to 160 GPa and wherein said glass-ceramic comprises in weight percent on the oxide basis:

| | |
|---|---|
| SiO$_2$ | 40–60% |
| MgO | 10–20% |
| Al$_2$O$_3$ | 10% to less than 20% |
| CaO | 0.5–4% |
| SrO | 0.5–4% |
| BaO | 0.5–5% |
| TiO$_2$ | more than 8% to 12%. |

2. A high rigidity glass-ceramic substrate having a predominant crystal phase or phases, said predominant crystal phase comprising enstatite (MgSiO$_3$) or enstatite solid solution (MgSiO$_3$ solid solution) as a first crystal phase having the largest ratio of precipitation and at least one selected from the group consisting of magnesium titanate (MgTi$_2$O$_5$), magnesium titanate solid solution (MgTi$_2$O$_5$ solid solution), spinel and spinel solid solution as a second crystal phase having a smaller ratio of precipitation than the first crystal phase, and glass-ceramic constituting the glass-ceramic substrate having Young's modulus within a range from 115 GPa to 160 GPa and wherein said glass-ceramic comprises in weight percent on the oxide basis:

| | |
|---|---|
| $SiO_2$ | 40–60% |
| MgO | 10–20% |
| $Al_2O_3$ | 10% to less than 20% |
| CaO | 0.5–4% |
| SrO | 0.5–4% |
| BaO | 0.5–5% |
| $TiO_2$ | more than 8% to 12%. |

3. A high rigidity glass-ceramic substrate as defined in claim 1 wherein said glass-ceramic is substantially free from $Li_2O$, $Na_2O$ and $K_2O$.

4. A high rigidity glass-ceramic substrate as defined in claim 1 having a surface roughness Ra (arithmetic mean roughness) after polishing of 8 Å or below and a maximum surface roughness Rmax after polishing of 100 Å or below.

5. A high rigidity glass-ceramic substrate as defined in claim 1 having a coefficient of thermal expansion within a range from $40 \times 10^{-7}/°$ C. to $60 \times 10^{-7}/°$ C. within a temperature range from −50° C. to +70° C.

6. A high rigidity glass-ceramic substrate as defined in claim 1 wherein said predominant crystal phase has a crystal grain diameter within a range from 0.05 μm to 0.30 μm.

7. A high rigidity glass-ceramic substrate as defined in claim 1 having Vickers hardness within a range from 6860 $N/mm^2$ to 8330 $N/mm^2$.

8. A high rigidity glass-ceramic substrate as defined in any of claims 1, 2, 3–7 wherein said glass-ceramic comprises in weight percent on the oxide basis:

| | |
|---|---|
| $SiO_2$ | 40–60% |
| MgO | 10–18% |
| $Al_2O_3$ | 10% to less than 20% |
| CaO | 0.5–4% |
| SrO | 0.5–4% |
| BaO | 0.5–5% |
| $ZrO_2$ | 0–5% |
| $TiO_2$ | more than 8% to 12% |
| $Bi_2O_3$ | 0–6% |
| $Sb_2O_3$ | 0–1% |
| $As_2O_3$ | 0–1%. |

9. A high rigidity glass-ceramic substrate as defined in claim 1 further comprising an element selected from the group consisting of P, W, Nb, La, Y and Pb in an amount up to 3 weight percent on the oxide basis and/or an element selected from the group consisting of Cu, Co, Fe, Mn, Cr, Sn and V in an amount up to 2 weight percent on the oxide basis.

10. A high rigidity glass-ceramic substrate as defined in claim 1 which is provided by melting glass materials, forming and annealing a base glass and subjecting the base glass to heat treatment for crystallization under a nucleation temperature within a range from 650° C. to 750° C., a nucleation time within a range from one hour to twelve hours, a crystallization temperature within a range from 850° C. to 1000° C. and a crystallization time within a range from one hour to twelve hours.

11. A magnetic information storage disk provided by forming a film of a magnetic information storage medium on the high rigidity glass-ceramic substrate as defined in claim 1.

* * * * *